(12) United States Patent
Donahue et al.

(10) Patent No.: US 10,581,903 B2
(45) Date of Patent: Mar. 3, 2020

(54) SYSTEMS AND METHODS FOR PREVENTING DENIAL OF SERVICE ATTACKS UTILIZING A PROXY SERVER

(71) Applicant: Level 3 Communications, LLC, Broomfield, CO (US)

(72) Inventors: Thomas P. Donahue, Littleton, CO (US); Henry Yu, Castle Rock, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 148 days.

(21) Appl. No.: 15/345,067

(22) Filed: Nov. 7, 2016

(65) Prior Publication Data
US 2017/0366576 A1 Dec. 21, 2017

Related U.S. Application Data

(60) Provisional application No. 62/350,890, filed on Jun. 16, 2016.

(51) Int. Cl.
*H04L 29/06* (2006.01)
*H04L 12/26* (2006.01)
*H04L 29/08* (2006.01)

(52) U.S. Cl.
CPC ........ *H04L 63/1458* (2013.01); *H04L 43/062* (2013.01); *H04L 43/067* (2013.01);
(Continued)

(58) Field of Classification Search
CPC . H04L 63/1458; H04L 43/062; H04L 43/067; H04L 63/1416; H04L 63/1433;
(Continued)

(56) References Cited

U.S. PATENT DOCUMENTS

2012/0203861 A1*  8/2012  Flack ................... G06Q 10/10
                                                 709/217
2013/0046664 A1*  2/2013  Kazerani .............. G06F 9/541
                                                  705/34
(Continued)

OTHER PUBLICATIONS

International Search Report dated Feb. 3, 2017, Int'l Appl. No. PCT/US16/060822, Int'l Filing Date Nov. 7, 2016; 3 pgs.
(Continued)

*Primary Examiner* — Michael Pyzocha
*Assistant Examiner* — Zoha Piyadehghibi Tafaghodi

(57) ABSTRACT

Aspects of the present disclosure involve systems, methods, computer program products, and the like, for utilizing an access log of a proxy server device of a content delivery network (CDN) to detect and mitigate a denial of service (DOS) on a web or content server hosted by the CDN. Through an analysis of the content requests received at the proxy server listed in the access logs, one or more IP addresses may be identified as involved in a potential DOS attack or other suspicious behavior. Once identified, the suspicious activities of the one or more IP addresses may be tracked and aggregated over a particular period of time, with each detected suspicious request to the content server being counted. The count of suspicious requests to the content server may then be compared to one or more threshold values and a remediation action may occur when the thresholds are met or exceeded.

22 Claims, 5 Drawing Sheets

(52) U.S. Cl.
CPC ...... H04L 63/0236 (2013.01); H04L 63/0281 (2013.01); H04L 63/1416 (2013.01); H04L 63/1425 (2013.01); H04L 63/1433 (2013.01); H04L 67/2833 (2013.01)

(58) Field of Classification Search
CPC ............. H04L 67/2833; H04L 63/0236; H04L 63/0281
USPC .......................................................... 726/23
See application file for complete search history.

(56) References Cited

U.S. PATENT DOCUMENTS

| | | | | |
|---|---|---|---|---|
| 2013/0097708 | A1* | 4/2013 | Jayanthi | G06F 21/554 726/25 |
| 2013/0103785 | A1* | 4/2013 | Lyon | H04N 21/2385 709/217 |
| 2014/0150095 | A1* | 5/2014 | Zhao | H04L 29/06 726/22 |
| 2015/0288715 | A1* | 10/2015 | Hotchkiss | H04L 63/0876 726/7 |
| 2017/0155732 | A1* | 6/2017 | Ara jo | H04L 67/2842 |
| 2017/0366576 | A1* | 12/2017 | Donahue | H04L 43/062 |

OTHER PUBLICATIONS

Written Opinion of the International Searching Authority dated Feb. 3, 2017, Int'l Appl. No. PCT/US16/060822, Int'l Filing Date Nov. 7, 2016; 4 pgs.

International Preliminary Report on Patentability, dated Dec. 18, 2018, Int'l Appl. No. PCT/US16/060822, Int'l Filing Date Nov. 7, 2016; 6 pgs.

* cited by examiner

SYSTEMS AND METHODS FOR PREVENTING DENIAL OF SERVICE ATTACKS UTILIZING A PROXY SERVER

CROSS-REFERENCE TO RELATED APPLICATIONS

This application is related to and claims priority under 35 U.S.C. § 119(e) from U.S. Patent Application No. 62/350,890, filed Jun. 16, 2016, titled "SYSTEM AND METHOD FOR PREVENTING DENIAL OF SERVICE ATTACKS UTILIZING A PROXY SERVER," the entire content of which is incorporated herein by reference for all purposes.

TECHNICAL FIELD

Aspects of the present disclosure generally relate to computer networks, and more particularly to utilizing a proxy server device of a content delivery network to detect and prevent denial of service attacks on a customer server of the network.

BACKGROUND

The Internet and the World Wide Web (the "Web") are ubiquitous and easily accessible using numerous possible devices. Content providers (publishers) now use the Internet (and, particularly, the Web) to provide all kinds of content to numerous users throughout the world. In order to offload the job of serving some or all of its content, many content providers now operate or subscribe to content delivery networks (CDNs). Using a CDN, content can be served to clients from the CDN (i.e., from one or more content servers in the CDN) instead of from the content provider's server(s). In a caching CDN, content may also be cached on some or all of the CDN servers, either before being served or in response to specific requests for that content. Having content cached enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

In some instances, CDNs may suffer an attack by an actor to gain access to the network or to disrupt the operation of the network. A denial of service (DOS) attack is an attempt to make content servers or other resources of a company unavailable to legitimate users. In general, such attacks include flooding a content server with phony requests for information from the content server at such a frequency to impede other legitimate traffic or requests from being fulfilled by the content server. A distributed denial of service (DDOS) attack is similar except that the requests for the content are received from more than one, often thousands, of unique Internet Protocol (IP) addresses. As should be appreciated, such attacks may negatively impact the ability of the CDN to provide content to legitimate customers.

It is with these and other issues in mind that various aspects of the present disclosure were developed.

SUMMARY

One implementation of the present disclosure may take the form of a method for managing a content delivery network (CDN). The method may include the operations of obtaining an access log of a proxy server in communication with an associated content server of the CDN, the access log comprising uniform resource locator (URL) requests for content intended for the associated content server and scanning the access log to detect a plurality of entries in the access log indicating the proxy server receiving a first URL request of a group of related URL requests from a particular Internet Protocol (IP) address associated with a requesting device, the receiving of the first URL request of the group of related URL requests from the particular IP address occurring within a first timeframe. Further, the method may include comparing the plurality of entries in the access log indicating the proxy server receiving the first URL request of the group of related URL requests from the particular IP address associated with a requesting device to a first threshold value and storing the particular IP address in a listing of potential sources of denial of service (DOS) attacks on the associated content server when the plurality of entries in the access log indicating the proxy server receiving the first URL request of the group of related URL requests from the particular IP address associated with a requesting device is greater than the first threshold value Another implementation of the present disclosure may take the form of a content delivery network (CDN). The CDN may include a content server through which content is available to a plurality of requesting devices and a proxy server in communication between the content server and the plurality of requesting devices. The proxy server is configured to obtain an access log comprising uniform resource locator (URL) requests for content intended for the associated content server and detect a plurality of entries in the access log indicating the proxy server receiving a first URL request of a group of related URL requests from a particular Internet Protocol (IP) address associated with a requesting device of the plurality of requesting devices within a first timeframe. The proxy server is further configured to compare the plurality of entries in the access log indicating the proxy server receiving the first URL request of the group of related URL requests from the particular IP address associated with a requesting device to a first threshold value and store the particular IP address in a listing of potential sources of denial of service (DOS) attacks on the associated content server when the plurality of entries in the access log indicating the proxy server receiving the first URL request of the group of related URL requests from the particular IP address associated with a requesting device is greater than the first threshold value.

DETAILED DESCRIPTION

Figure 1:
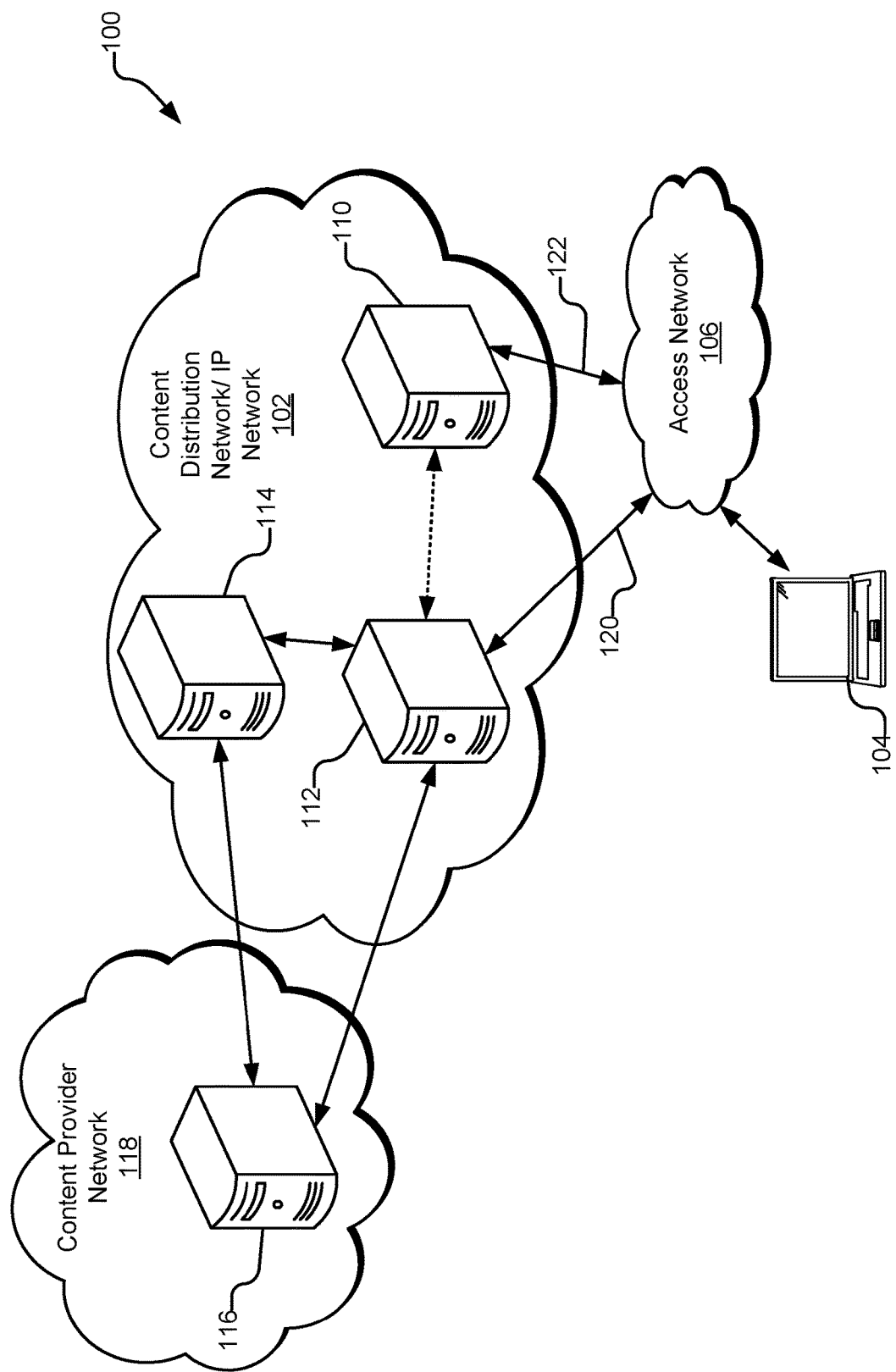
FIG. 1 is an example network environment for distributing content to an end user from a network, such as a content delivery network (CDN).

Aspects of the present disclosure involve systems, methods, computer program products, and the like, for utilizing an access log of a proxy server device of a content delivery network (CDN) to detect and mitigate a denial of service (DOS) or distributed denial of service (DDOS) attack (collectively referred to as a DOS attack) on a web or content server hosted by the CDN. In general, the access logs of the proxy server provide a listing of the requests made to the content server from particular Internet Protocol (IP) addresses. Through an analysis of the content requests received at the proxy server, one or more IP addresses may be identified as involved in a potential DOS attack or other suspicious behavior. Once identified, the suspicious activities of the one or more IP addresses may be tracked and aggregated over a particular period of time, with each detected suspicious request to the content server being counted. The count of suspicious requests to the content server may then be compared, in some embodiments, to one or more threshold values and a remediation action may occur when the thresholds are met or exceeded, such as providing a report or notification of the activity to an administrator of the content server and/or blocking future access to the content server from the identified IP addresses.

In one particular embodiment of the present disclosure, a proxy server is configured to maintain an access log of Uniform Resource Locator (URL) requests to a content server. These access logs may include a source IP address from which the request is received, a day/time stamp of receipt of the request, and the type of URL request, among other information. Typically, a URL request for content from the content server instructs the computing device associated with the IP address to provide additional URL requests for additional information from the content server. Through an analysis of the access logs, the proxy server (or other networking device) may identify those instances where a URL request for content is not followed by additional URL requests to the content server from the same IP address. These single URL requests are often associated with a DOS attack of some type on the content server. When detected, the proxy server may label such activity from the IP address as suspicious and track the number and type of suspicious occurrences from one or more IP addresses requesting content from the content server. A certain number of tracked occurrences over a particular period of time may trigger one or more actions taken by the CDN to address the potential DOS attack on the content server.

The process of identification of suspicious IP addresses and associated action taken in response to the detected activity from the IP address at the content server may be configurable in many ways to tailor the system and methods to the desires of a content server administrator. For example, certain URL requests may be known as including a single URL request with no additional requests from the IP address. The proxy server may be configured to allow these types of requests to the content server without logging them as suspicious. In addition, certain types of URL requests may be known to historically be associated with DOS attacks, such as multiple login requests from a single IP address. The threshold values associated with these types of URL requests may be lower than other types of requests within the proxy server such that preventative actions may occur faster, making the response of the proxy server more sensitive to these known requests. Similarly, the types of preventative actions associated with one or more IP addresses may be adjusted, such as decreasing the threshold value upon which an action is taken and/or increasing the length of a block applied to the IP address. Further still, the proxy server may be configured to identify DDOS-type attacks that may occur from several IP addresses and take such action as to prevent access from the several IP address associated with the DDOS attack. Through these systems and methods, the proxy server may more quickly identify and respond to potential DOS attacks than over previous preventative schemes.

As discussed above, aspects of the present disclosure involve systems, methods, computer program products, and the like, for managing the distribution of content and/or communications from a computer network to an end user of the network. In general, the system receives a request for content from the network from a user of the network and determines a server or content providing component within the network to provide the content to the user. For example, FIG. 1 is a network environment 100 for distributing content to one or more users. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks. In yet another embodiment, the user device 104 may be a component of access network 106.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, a user of the user computing device 104 enters a link name (e.g., URL or other identifier) into a browser executed on the computing device. The link name is associated with a network address within the CDN 102 at which the content may be obtained and provided to the computing device. For example, the user or the user device may enter a URL such as www.example.com/content into the browser of the computing device 104. Upon entering the URL, the hostname may be extracted by the browser (www.example.com in this particular case) and sends a request (possibly via an operating system running within the computing device 202) to a domain name server (DNS) associated with the user's access network 106. The DNS associated with the user's access network is known as the ISP resolver. In one example, the DNS request transmitted to the ISP resolver from the computing device 104 includes the hostname of the requested content, as well as an IP address associated with the computing device.

While the ISP resolver is often implemented to cache responses, the ISP resolver often does not have a cached IP address for the requested content within the CDN 102. In such cases, the ISP resolver transmits a second DNS request to a DNS server (such as directory server 110) of the CDN 102 to determine an IP address in the CDN 102 at which the content file may be obtained. Thus, in one embodiment, the DNS server 110 of the CDN 102 may be referred to as an Authority Server. Similar to the DNS request above, the DNS request to Authority Resolver 110 may include the hostname of the requested content, as well as an IP address associated with the computing device and/or an IP address associated with the ISP resolver of the access network 106.

Figure 2:
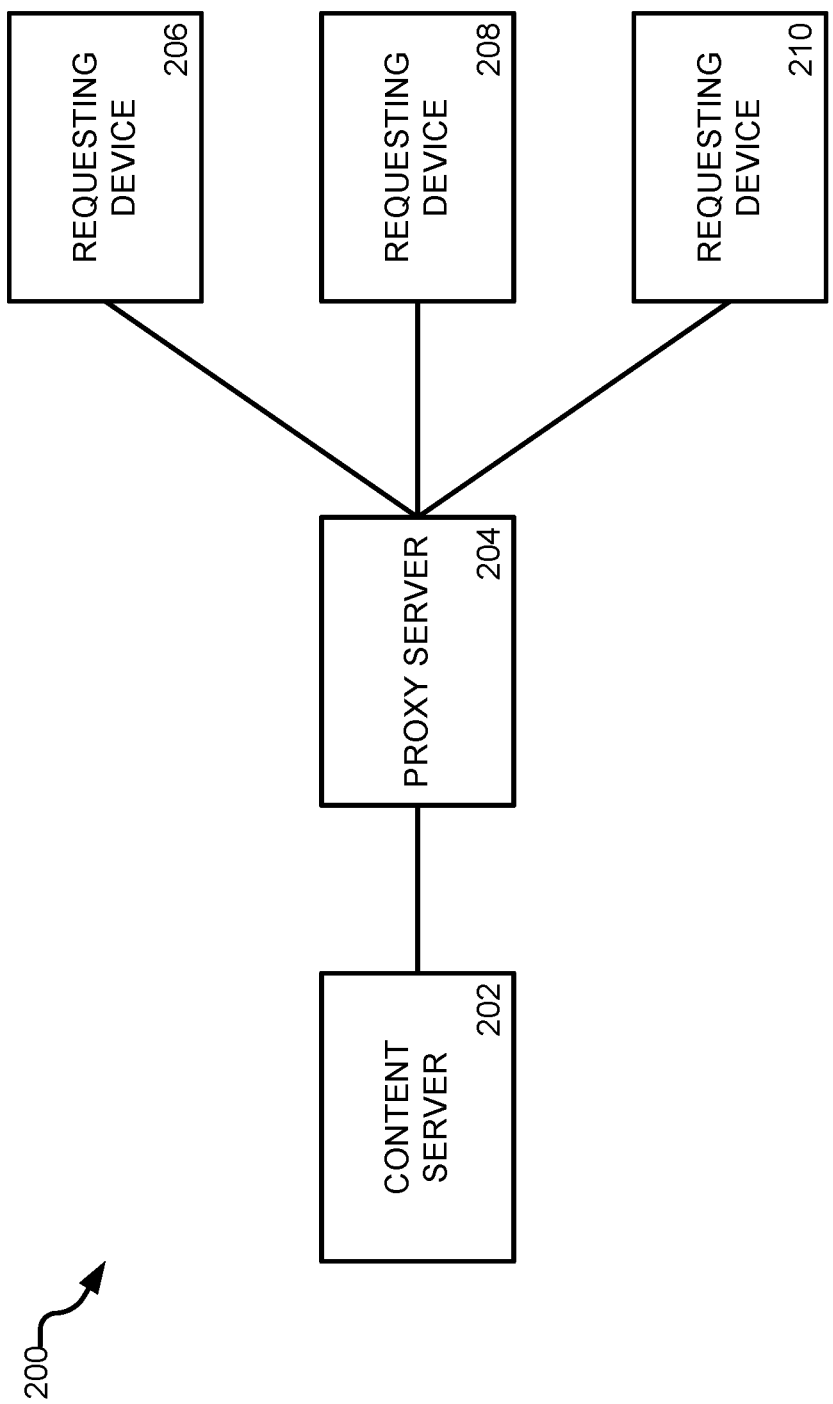
FIG. 2 is an example network environment for utilizing a proxy server with a web content server of a customer of a CDN.

In many instances, a proxy server is associated with one or more content servers of the CDN. For example, FIG. 2 is an example network environment 200 for utilizing a proxy server 204 with a web content server 202 of a customer of a CDN. In general, the proxy server 204 acts as a gateway to the content server 202 for the clients 206-210 of the CDN. As such, requests from the clients 206-210 for content maintained by the content server 202 are received and processed by the proxy server 204 before being provided to the content server. The proxy server 204 may be configured to process each request and potentially deny access to the content server 202 to one or more client devices 206-210 based on any number of processing rules. For example, if the request from IP address 206 is identified as a DOS attack, the proxy server 204 may deny access (or block) the client device at the IP address from accessing the content server 202. Typically, the client devices 206-210 are unaware of the presence of the proxy server 204 in the network. Further, in some embodiments a proxy server 204 may provide the proxy server functions for several such content servers 202. In other words, requests to several content servers may be first processed by a proxy server, such as proxy server 204.

Figure 3:
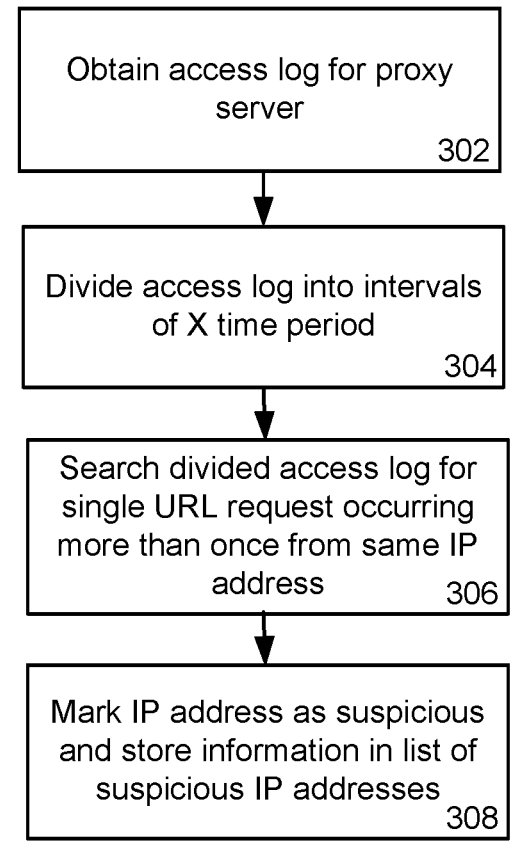
FIG. 3 is a flowchart of a method for detecting a potential denial of service attack on a web content server of a CDN.

In the present disclosure, the proxy server 204 may execute methods or techniques to identify potential DOS attacks from one or more of the client devices 206-210. When such attacks are identified, the proxy server 204 may further take actions to prevent access to the content server 202 from the identified client IP addresses for some time. FIG. 3 illustrates one such method 300 for detecting a potential denial of service attack on a web content server of a CDN. In general, the operations of the method 300 of FIG. 3 may be performed by a proxy server of a CDN. In other embodiments, the operations are performed by one or more telecommunication devices (such as an application server) in communication with the proxy server to control the gateway function of the proxy server. Such operations may be performed through one or more processor-executed software instructions, one or more hardware components arranged to perform the described functions, or a combination of both software and hardware components.

Beginning in operation 302, the proxy server obtains an access log that includes the URL requests intended for the content server from one or more client devices. For example, a client device (identified with an IP address) may transmit a URL request to the content server to obtain a webpage. The URL request from the client device may be received at the proxy server 204 and stored in the access log. Upon storing, the proxy server 204 may transmit the received URL request to the content server 202 for processing by the content server. In some instances explained in more detail below, the proxy server 204 may act as a firewall-type device for the content server 202 and deny some requests for content from the content server. In general, the URL request may include the URL request type, the IP address of the requesting device, the URL destination address, the date/time stamp the URL request is received, and similar information. Each URL request to the content server 202 is logged accordingly in the access log of the content server or proxy server 204.

As mentioned above, many URL requests are typically followed by similar URL requests from the same client device. For example, the URL request may be for a webpage. The content server, upon receiving the request, provides an HTML document to the client device. When the returned HTML document is processed by a browser program on the client device, the web page is displayed within the browser on the client's display. In many instances, the HTML document instructs the client device to obtain or request additional information from the content server in order to fully display the web page. Thus, the client device may again transmit another URL request to the content server to obtain the additional content for the web page. In general, each URL request includes some indication of the content being requested. Often, several URL requests for content from the content server 202 are received at the proxy server 204 in order for the client device to fully display the web page. Each of the URL requests to provide the web page to the client device at the associated IP address are then included in the access log of the proxy server.

In operation 304, the proxy server 204 breaks up the access log into X number of seconds (or any other type of timeframe) and processes the information in the access log for each interval. In one example, the proxy server may obtain and process the access log every second, although any length of time may be utilized by the proxy server 204 when processing new additions to the access log. During processing in operation 306, the proxy server 204 scans the log for an indication of a single URL request received from an IP address that is not followed within the designated time window by additional URL requests from the same IP address. As mentioned above, typical requests for content include several related URL requests received soon after the initial request for the content. However, DOS attacks may not include the several related URL requests that follow the initial request. Rather, a DOS attack may be characterized by receiving a single URL request from the requesting device 206-210 without the additional related URL requests within the X time window. In one embodiment, the proxy server 204 may scan the access log for more than one such URL request from the same IP address (or same requesting device 206-210). In other words, a single URL request from an IP address not followed by the related URL requests may not be noted as suspicious, but two or more such URL requests from the same or related requesting devices 206-210 not followed by the related URL requests may be noted as suspicious by the proxy server 204.

In operation 308, entries in the access log that meet the above criteria are indicated as suspicious by the proxy server 204 in a listing of recent suspicious activity at the content server 202. In particular, the proxy server 204 may maintain a listing of all IP addresses that are marked as suspicious in the above processing of the access log. This listing may include, in one instance, the IP address and a count of the number of noted suspicious URL requests to the content server. In one embodiment, the listing of suspicious activity from an IP address may be maintained in the list for a finite time period, such as time period Y. For example, the listing may include a count for each suspicious IP address over the previous 1,000 seconds, although any length of time for maintaining a listing of suspicious IP addresses may be utilized by the proxy server 204. Through the operations above, the proxy server 204 thus processes an access log to a content server 202 to determine if any URL request is received that is not followed by expected additional URL requests from the same or related IP address. When found, the proxy server 204 stores an indication of the suspicious IP address and maintains a count of each instance for that IP address over a period of time.

Figure 4:
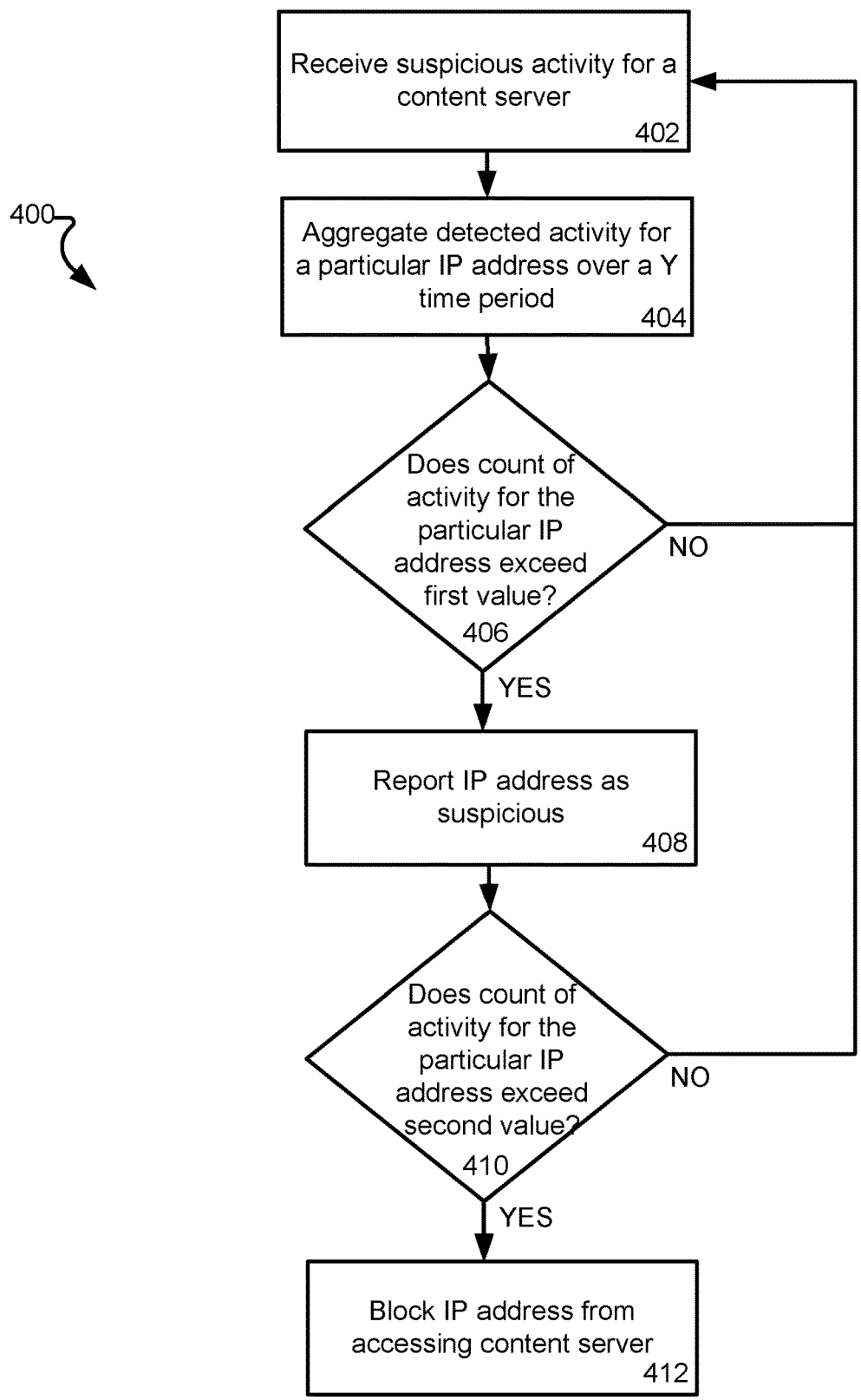
FIG. 4 is a flowchart of a method for preventing a potential denial of service attack on a web content server of a CDN.

With the list and count of suspicious activity from IP addresses obtain through the method 300 of FIG. 3, the proxy server 204 may also take one or more actions based on the information stored in the list. For example, FIG. 4 is a flowchart of a method 400 for preventing a potential denial of service attack on a web content server 202 of a CDN. Similar to the method described above, the operations of the method 400 of FIG. 4 may be performed by the proxy server 204 or any other telecommunications devices through a combination of hardware and software components.

Beginning in operation 402, the proxy server 204 receives the suspicious activity for the content server 202 through the process discussed above. Such activity may be for one or more content servers 202 of the telecommunications network. In operation 404, the proxy server 204 aggregates the detected suspicious activity for a particular IP address over a time period Y. As explained above, the proxy server 204 may maintain a listing of suspicious IP addresses and a count of the number of noted suspicious URL requests to the content server 202 from each of the suspicious IP addresses in the listing. Further, the instances of suspicious activity from any IP address may be maintained in the list for a finite time period Y, such as 1,000 seconds. Through this listing, a snapshot for a period of time of the detected suspicious URL requests from any such IP address accessing the content server 202 is determined by the proxy server 204.

One or more activities or responses may be executed by the proxy server 204 based on the information maintained by the proxy server. For example, in operation 406 the proxy server 204 processes the list of suspicious activity and determines if the count of received suspicious URL requests exceeds a first threshold value. For example, the proxy server 204 may determine if the number of suspicious requests received at the proxy server from a particular IP address within the Y time period exceeds or equals a threshold value of five. If not, the proxy server 204 returns to operation 402 to monitor additional potential suspicious URL requests. However, if the suspicious activity count exceeds or equals the first threshold value, the proxy server 204 may transmit or otherwise provide a report or alert to a system administrator indicating the IP address associated with the suspicious activity in operation 408. In one embodiment, the reporting of the suspicious IP address includes generating and transmitting an electronic mail to the system administrator. In another embodiment, the reporting includes logging the IP address into a list of suspicious IP addresses that is accessible by the system administrator.

Further, in operation 410, the proxy server 204 may process the list of suspicious activity to determine if the count of received suspicious URL requests exceeds or equals a second threshold value. Generally, the second threshold value is higher than the first threshold value. In one embodiment, the second threshold value is 10 such that a count of 10 or more suspicious requests from an IP address within the Y time period triggers a second response. If the count for the IP address has not exceeded or equals the second threshold value, the proxy server 204 returns to operation 402 to monitor additional potential suspicious URL requests. However, if the suspicious activity count exceeds or equals the second threshold value, the proxy server 204 may execute a blocking feature in operation 412 that prevents the suspected IP address from access to the content server 202 for a period of time. For example, the proxy server 204 may add the suspicious IP address to an IP table of blocked addresses that prevents access to the content server 202. The suspicious IP address may be included in the IP table for a set period of time and removed when the period of time expires. When a request is received at the proxy server 204 intended for the content server 202 from the blocked IP address, the proxy server may deny the request for the content. As explained below, the period of time the suspicious IP address is blocked may vary based on several factors. Through the method 400 of FIG. 4, the proxy server 204 may undertake one or more actions to prevent a potential DOS attack from one or more suspicious IP addresses.

In some embodiments of the proxy server 204, several of the above-described operations are configurable to further refine the detection of suspicious activity from one or more IP addresses and actions taken to prevent a potential DOS attack. For example, some URL requests to a content server 202 may not follow the typical form of a first URL request from the IP address, followed by additional URL requests from the same IP address for additional content. Rather, some content servers 202 may operate similar to application program interface (API) server that typically receive single URL requests without additional related URL requests. More particularly, these single URL requests may be of a certain type of URL request such that the proxy server 204 may be configured to monitor for those types of URL requests and to not indicate such requests as suspicious. In one embodiment, the proxy server 204 may utilize a regular expression search pattern that matches or otherwise indicates a typically single URL request. When a match is received from an IP address, the proxy server 204 may not note the URL request as suspicious such that a count of suspicious activity from the IP address is not incremented when the single URL request is received.

In a similar embodiment, the response action taken by the proxy server 204 to prevent a DOS attack may vary based on a type of URL request detected in the access log. For example, some URL requests may request more information or content from the content server 202 than other requests. Such requests are particularly useful in a DOS attack and the receipt of multiple requests of these types from the same IP address within the Y time period is a high indicator of a DOS attack. As such, the threshold values for reporting and/or blocking the IP address at the proxy server 204 may be increased for the particular types of URL requests. For example, multiple URL requests for a particular .pdf type file from the IP address indicates a high likelihood of a DOS attack. Thus, for .pdf URL requests, the threshold values may be decreased to ensure the proxy server 204 responds quicker to the DOS request. Utilizing the above example, the threshold value for .pdf URL requests may be lowered to two (down from five) to trigger a reporting action and four (down from ten) to trigger a blocking action. An increase in sensitivity of the system may be applied for other types of URL requests, such as requests for error messages, URL post requests, URL options requests, and the like.

In a similar manner, the parameters of a preventative action taken by the proxy server 204 may be adjusted in response to conditions of the detected suspicious activities. For example, if the proxy server 204 determines that a particular IP address is a consistent source of suspicious activity, the threshold value to trigger a report/blocking activity for that particular IP address may be lowered. In one particular embodiment, a database of known sources of DOS attacks listed by IP address may be accessed by the proxy server 204 to compare with suspicious IP addresses. Further, the length of a blocking period for that particular IP address may be increased as more and more suspicious activities are detected from the particular IP address. In general, any of the parameters of the actions undertaken by the proxy server in response to a detected suspicious activity from an IP address may be configurable.

In still another embodiment, the proxy server 204 may be configured to monitor for a DDOS attack from multiple IP addresses. In particular, the proxy server 204 may analyze the types and patterns of suspicious received URL requests. If several IP addresses provide the same types and patterns of URL requests, such IP addresses may be a part of a DDOS attack. In some embodiments, each detected instance of attack from the multiple IP addresses may be aggregated into a single count in the list of suspicious activity. In other words, rather than storing a count of suspicious activity for each individual IP address, the proxy server 204 may treat each of the multiple IP addresses of the potential DDOS attack as one when aggregating the count for that attack. In this embodiment, each of the multiple IP addresses may be reported and/or blocked based on the combined suspicious count for all of the suspicious IP addresses. In this manner, the proxy server 204 may more quickly detect and respond to a potential DDOS attack from the multiple IP addresses.

Figure 5:
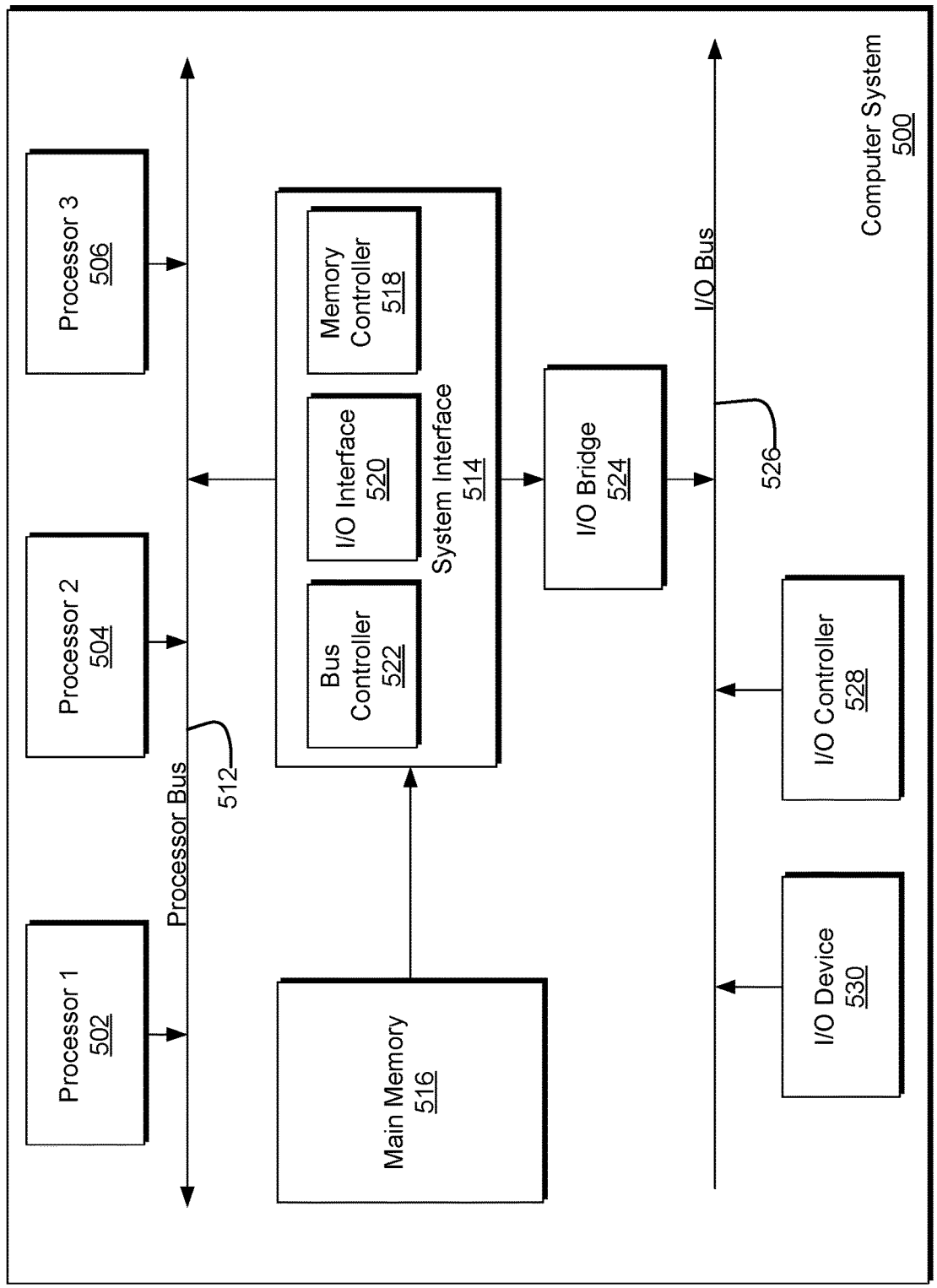
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the network disclosed above. In particular, the computing device of FIG. 5 is one embodiment of the proxy server or other networking component that performs one of more of the operations described above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 515 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 550, as illustrated.

I/O device 550 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for managing a content delivery network (CDN), the method comprising:
    obtaining an access log of a proxy server in communication between an associated content server of the CDN and a plurality of requesting devices, the access log comprising uniform resource locator (URL) requests for content intended for the associated content server;
    scanning the access log to detect a plurality of entries in the access log indicating the proxy server receiving a plurality of first URL requests from a particular Internet Protocol (IP) address associated with a requesting device of the plurality of requesting devices, the receiving of the plurality of first URL requests from the particular IP address occurring within a first timeframe, each of the plurality of first URL requests being a request for a same information, the each of the plurality of first URL requests not followed, within the first timeframe, by an additional URL request for an additional information;
    determining a denial of service (DOS) attack occurred based on the each of the plurality of first URL requests not followed, within the first timeframe, by the additional URL request for the additional information;
    comparing the plurality of entries in the access log indicating the proxy server receiving the plurality of first URL requests from the particular IP address associated with a requesting device to a first threshold value; and
    storing the particular IP address in a listing of potential sources of DOS attacks on the associated content server when the plurality of entries in the access log indicating the proxy server receiving the plurality of first URL requests from the particular IP address associated with a requesting device is greater than the first threshold value.

2. The method of claim 1 further comprising:
    executing a remedial instruction in response to the storing of the particular IP address in the listing of potential sources of DOS attacks.

3. The method of claim 2 wherein the remedial instruction comprises transmitting a report to an administrator device associated with an administrator of the proxy server, the report comprising a listing of particular IP address associated with a requesting device.

4. The method of claim 2 further comprising:
    comparing the plurality of entries in the access log indicating the proxy server receiving the plurality of first URL requests from the particular IP address associated with a requesting device to a second threshold value, the second threshold value greater than the first threshold value.

5. The method of claim 4 wherein the remedial instruction comprises utilizing the proxy server to block access to the content of the associated content server by the particular IP address for a remedial period of time when the plurality of entries in the access log indicating the proxy server receiving the plurality of first URL requests from the particular IP address associated with a requesting device is greater than the second threshold value.

6. The method of claim 5 further comprising:
    comparing the particular IP address to a database of known IP addresses of previously received DOS attacks to determine if the IP address is included in the database of known IP addresses.

7. The method of claim 6 further comprising:
    analyzing the plurality of first URL requests from the particular IP address associated with a requesting device to determine a pattern of DOS attack requests from the IP address; and
    storing the pattern of DOS attack requests from the IP address in the database of known IP addresses of previously received DOS attacks.

8. The method of claim 1 wherein the particular URL request for content received at the proxy server comprises a URL request type indicating a type of content requested from the associated content server.

9. The method of claim 8 further comprising:
adjusting the first threshold value based at least on the URL request type included in the URL request for content received at the proxy server.

10. The method of claim 1 further comprising:
aggregating the plurality of entries in the access log indicating proxy server receiving the plurality of first URL requests from the particular IP address occurring within a second timeframe.

11. The method of claim 1 wherein the each of the plurality of first URL requests is a request for a webpage and wherein the additional URL request is for additional information in order to display the webpage.

12. A content delivery network (CDN) comprising:
a content server through which content is available to a plurality of requesting devices; and
a proxy server in communication between the content server and the plurality of requesting devices, the proxy server configured to:
obtain an access log comprising uniform resource locator (URL) requests for content intended for the associated content server;
detect a plurality of entries in the access log indicating the proxy server receiving a plurality of first URL requests from a particular Internet Protocol (IP) address associated with a requesting device of the plurality of requesting devices within a first timeframe, each of the plurality of first URL requests being a request for a same information, the each of the plurality of first URL requests not followed, within the first timeframe, by an additional URL request for an additional information;
determine a denial of service (DOS) attack occurred based on the each of the plurality of first URL requests not followed, within the first timeframe, by the additional URL request for the additional information;
compare the plurality of entries in the access log indicating the proxy server receiving the plurality of first URL requests from the particular IP address associated with a requesting device to a first threshold value; and
store the particular IP address in a listing of potential sources of DOS attacks on the associated content server when the plurality of entries in the access log indicating the proxy server receiving the plurality of first URL requests from the particular IP address associated with a requesting device is greater than the first threshold value.

13. The content delivery network of claim 12 wherein the each of the plurality of first URL requests is a request for a webpage and wherein the additional URL request is for additional information in order to display the webpage.

14. The content delivery network of claim 12 wherein the proxy server further executes a remedial instruction in response to the storing of the particular IP address in the listing of potential sources of DOS attacks.

15. The content delivery network of claim 14 wherein the remedial instruction comprises transmitting a report to an administrator device associated with an administrator of the proxy server, the report comprising a listing of particular IP address associated with a requesting device.

16. The content delivery network of claim 14 wherein the proxy server further compares the plurality of entries in the access log indicating the proxy server receiving the plurality of first URL requests from the particular IP address associated with a requesting device to a second threshold value, the second threshold value greater than the first threshold value.

17. The content delivery network of claim 16 wherein the remedial instruction comprises blocking access to the content of the associated content server by the particular IP address for a remedial period of time when the plurality of entries in the access log indicating the proxy server receiving the plurality of first URL requests from the particular IP address associated with a requesting device is greater than the second threshold value.

18. The content delivery network of claim 17 wherein the proxy server further compares the particular IP address to a database of known IP addresses of previously received DOS attacks to determine if the IP address is included in the database of known IP addresses.

19. The content delivery network of claim 18 wherein the proxy server analyzes the plurality of first URL requests from the particular IP address associated with a requesting device to determine a pattern of DOS attack requests from the IP address and stores the pattern of DOS attack requests from the IP address in the database of known IP addresses of previously received DOS attacks.

20. The content delivery network of claim 12 wherein the particular URL request for content received at the proxy server comprises a URL request type indicating a type of content requested from the associated content server.

21. The content delivery network of claim 20 wherein the proxy server further adjusts the first threshold value based at least on the URL request type included in the URL request for content received at the associated content server.

22. The content delivery network of claim 12 wherein the proxy server further aggregates the plurality of entries in the access log indicating the associated content server receiving the plurality of first URL requests from the particular IP address occurring within a second timeframe.

* * * * *